US 9,079,496 B2

(12) United States Patent
Boutron et al.

(10) Patent No.: US 9,079,496 B2
(45) Date of Patent: Jul. 14, 2015

(54) METHOD AND DEVICE FOR DISTRIBUTING AN ENGINE TORQUE BETWEEN TWO WHEEL SETS OF A MOTOR VEHICLE

(75) Inventors: Olivier Boutron, Aubevoye (FR); Pascal Febrer, Paris (FR); Francois Foussard, Versailles (FR); Nicolas Romani, Paris (FR)

(73) Assignee: RENAULT S.A.S., Boulogne-Billancourt (FR)

( * ) Notice: Subject to any disclaimer, the term of this patent is extended or adjusted under 35 U.S.C. 154(b) by 202 days.

(21) Appl. No.: 13/640,521

(22) PCT Filed: Apr. 7, 2011

(86) PCT No.: PCT/FR2011/050785
§ 371 (c)(1),
(2), (4) Date: Nov. 28, 2012

(87) PCT Pub. No.: WO2011/128559
PCT Pub. Date: Oct. 20, 2011

(65) Prior Publication Data
US 2013/0066531 A1    Mar. 14, 2013

(30) Foreign Application Priority Data
Apr. 12, 2010 (FR) .................................. 10 52773

(51) Int. Cl.
*B60K 23/08* (2006.01)
*B60K 1/00* (2006.01)
(52) U.S. Cl.
CPC ............. *B60K 23/0808* (2013.01); *B60K 23/08* (2013.01); *B60K 1/00* (2013.01); *B60W 2720/403* (2013.01)
(58) Field of Classification Search
CPC ...................................................... B60K 23/08
See application file for complete search history.

(56) References Cited

U.S. PATENT DOCUMENTS

| 4,261,309 | A  | * | 4/1981  | Biondi ..................... 123/179.21 |
| 6,213,242 | B1 |   | 4/2001  | Rodrigues et al. |
| 2002/0033293 | A1 | * | 3/2002  | Fukuda et al. ................ 180/250 |
| 2004/0222029 | A1 |   | 11/2004 | Shigeta et al. |
| 2006/0172853 | A1 | * | 8/2006  | Ishibashi et al. ................ 477/52 |
| 2007/0193808 | A1 | * | 8/2007  | Perakes et al. ................ 180/242 |
| 2008/0195288 | A1 | * | 8/2008  | Burkhart et al. ................ 701/69 |

FOREIGN PATENT DOCUMENTS

EP    1 188 596    3/2002

OTHER PUBLICATIONS

French Search Report Issued Dec. 6, 2010 in FR 10 52773 Filed Apr. 12, 2010.
International Search Report Issued Jul. 26, 2011 in PCT/FR11/50785 Filed Apr. 7, 2011.

* cited by examiner

*Primary Examiner* — John Q Nguyen
*Assistant Examiner* — Michael Kerrigan
(74) *Attorney, Agent, or Firm* — Oblon, McClelland, Maier & Neustadt, L.L.P.

(57) ABSTRACT

A device distributing engine torque between first and second wheel sets of a vehicle, including a mode switch movable between a first stable position and a second unstable position, activating first and second engine torque distribution modes. When the vehicle stops while the second distribution mode is activated and then restarts after a stop duration, the second distribution mode is activated if the stop duration is less than a time delay, otherwise the first distribution mode is activated. It is determined, in the second distribution mode, whether the vehicle exceeds a predetermined maximum speed threshold. If so, a transition is made to an on-road mode. In the off-road mode, it is determined whether the vehicle exceeds a predetermined intermediate speed threshold, strictly less than maximum speed threshold in an off-road mode, during a time greater than a predetermined duration, to transition back to the on-road mode.

11 Claims, 3 Drawing Sheets

METHOD AND DEVICE FOR DISTRIBUTING AN ENGINE TORQUE BETWEEN TWO WHEEL SETS OF A MOTOR VEHICLE

FIELD OF THE INVENTION

The invention relates to the distribution of an engine torque between a first wheel set and a second wheel set of an automobile vehicle with at least two drive wheel sets, that will henceforth arbitrarily be referred to as 'front wheel set' and 'rear wheel set'. It notably relates to the distribution of the engine torque between the front wheel set and the rear wheel set of a vehicle with four drive wheels. In particular, but in a non-limiting manner, the invention relates to the distribution of an engine torque from a main wheel set, still driven, to a secondary wheel set, driven in an intermittent way, or at the very least in lower proportions than the main wheel set, for example from a front wheel set to the rear wheel set of an automobile vehicle with four drive wheels.

BACKGROUND TO THE PRIOR ART

Vehicles having at least four drive wheels, also known as off-road vehicles, are designed to overcome all kinds of obstacles and, for this purpose, offer a drive system adapted to the driving conditions of the vehicle. When the vehicle is in off-road mode, the driving conditions of the vehicle are very limiting and the speed of the vehicle is accordingly low or medium.

When the vehicle is also designed for road use, it is advantageous for the driver to be able to choose between at least two, or even three, modes of operation, which can for example be a mode of operation with a single drive wheel set, a mode of operation for road with at least two drive wheel sets in which the ratio between the torque transmitted to the front wheel set and the torque transmitted to the rear wheel set varies as a function of parameters representative of the on-road behavior of the vehicle (for example speed of the vehicle, speed of the wheels, position of the accelerator pedal, angle of the steering wheel, yaw angular speed of the vehicle) in order to establish a compromise between the stability of the vehicle and the fuel consumption, and an off-road mode of operation favoring the adherence of the vehicle to the ground at low speed.

In order to allow the driver to choose a mode of operation, the vehicle may be equipped with a selector switch with several positions.

In the document EP 1 188 596, a vehicle is described that is equipped with a selector switch with three positions delivering three separate signals corresponding to a mode of operation with two drive wheels, an automatic on-road mode of operation with four drive wheels and a locked mode of operation with four drive wheels or off-road mode. When the driver attempts to activate the off-road mode at too high a speed, this mode is inhibited and the control remains in the on-road mode with four drive wheels.

DESCRIPTION OF THE INVENTION

One of the aims of the invention is to improve the automatic switching between an off-road control mode and a on-road control mode of a torque distributor between two wheel sets of an automobile vehicle.

For this purpose, according to a first aspect of the invention, a device is provided for distributing an engine torque between a first wheel set and a second wheel set of an automobile vehicle with at least two drive wheel sets, comprising:

a manual distribution mode selector switch, moveable between at least a first, stable position and a second, unstable position, the selector switch being mechanically returned from the second, unstable position to the first, stable position in the absence of any solicitation by the driver, the selector switch delivering a transient signal for selecting an off-road mode when going from the first to the second position, a torque distributor for distributing the engine torque between the first wheel set and the second wheel set, as a function of a torque distribution setpoint, means for generating the torque distribution setpoint as a function at least of the movements of the selector switch and of the speed of the vehicle, comprising:

means for determining a first setpoint value for distribution of the torque, means for determining a second setpoint value for distribution of the torque, and selection means for selecting the first setpoint value or the second setpoint value as a torque distribution setpoint, the selection means going from the first setpoint value to the second setpoint value at least when the selector switch delivers the signal for selection of the off-road mode while the speed of the vehicle is less than a predetermined threshold for engaging off-road mode, the selection means going from the second setpoint value to the first setpoint value at least when the speed of the vehicle exceeds a predetermined threshold for maximum speed in off-road mode.

Thus, the activation of the off-road mode is manual whereas the return to on-road mode is automatic at least when certain conditions are met. Of course, the predetermined threshold for engaging off-road mode is less than or equal to the predetermined threshold for maximum speed in off-road mode. These threshold values are adjustable during the factory setup or at the garage, and are saved in a non-volatile memory of the vehicle.

Of course, a manual return from the off-road mode to the on-road mode may also be provided, by providing for the selection means to go from the second setpoint value to the first setpoint value at least when the selector switch delivers the signal for selection of the off-road mode.

According to one embodiment, the means for generating the setpoint comprise a timer which is active when the electrical power supply of the vehicle is switched off while the second setpoint value is selected, then is restarted after a stopped time T, so as to select the second setpoint value if the stopped time T is less than a dwell time $T_R$, and otherwise the first setpoint value. The dwell time is adjustable during the factory setup or at the garage, and saved in a non-volatile memory of the vehicle. It is chosen to be greater than the time needed to restart the engine after stalling. Thus, it is possible to keep the off-road mode activated after an unplanned stall.

According to one embodiment, the selection means are such that when the torque distribution setpoint is equal to the second setpoint value and the speed of the vehicle remains higher than an intermediate speed threshold in off-road mode for a period of time exceeding a predetermined period, the first setpoint value is selected as torque distribution setpoint, the intermediate threshold being lower than the predetermined threshold for maximum speed in off-road mode. Thus, driving at an intermediate speed for a sufficient period of time is considered as an indication that the driving conditions are in fact road driving conditions.

According to one embodiment, the second setpoint value is independent of the speed of the vehicle. In practice, the torque distributor can be locked for an integral transmission of the torque.

According to one embodiment, the first setpoint value varies as a function of parameters including at least the speed of the vehicle.

According to one embodiment, in the first position, the selector switch delivers a continuous selection signal for the on-road mode. The selector switch is moveable between the first position and a third, stable, position, the first position being situated between the second and the third position, the selector switch delivering, in the third position, a continuous signal for selection of a mode with a single drive wheel set, the means for generating the torque distribution setpoint comprising means for determining a third setpoint value for distribution of the torque, and the selection means being capable of selecting the third setpoint value as torque distribution setpoint at least when the selector switch delivers the third selection signal.

The selector switch then delivers three separate signals:
- a signal for selecting the mode with a single drive wheel set which is continuous, in the sense that it exists for at least as long as the selector switch is set in the third position;
- a signal for selecting the on-road mode with two drive wheel sets, which is continuous, in the sense that it exists for at least as long as the selector switch is set in the first position;
- a transient signal for selection of the off-road mode and for return to the on-road mode, which is only emitted in a transient manner, for example in the form of a pulse, during the sequence where the selector switch passes via the second, unstable, position for selecting the off-road mode.

Preferably, each signal is emitted over an individual connection channel. In order to manage the transitions between the various positions of the selector switch, during the transition between the first position and the third position, it is provided for the selector switch to go through an overlap region in which the signal for selecting the on-road mode and the signal for selecting the mode with a single drive wheel set are simultaneously present. For the same reason, it is provided for the signal for selecting the on-road mode not to stop being emitted when the selector switch is driven to the second, unstable, position for selecting the off-road mode and for return to the first position for selecting the on-road mode. Thus, the continuous monitoring of the position of the selector switch is ensured, with no shadow area.

According to another aspect of the invention, the latter relates to a method for distributing an engine torque between a first wheel set and a second wheel set of an automobile vehicle with at least two drive wheel sets equipped with a mode selector switch moveable between at least a first, stable, position for activation of a first mode of distribution of the engine torque and a second, unstable, position for activation of a second mode of distribution of the engine torque for an off-road use of the vehicle, characterized in that when the electrical power supply of the vehicle is switched off while the second mode of distribution of the engine torque is activated, then restarted after a stopped time T, the second distribution mode is selected at the moment of the restart if the stopped time T is less than a dwell time Tt, and otherwise the first distribution mode is selected.

According to another aspect of the invention, the latter relates to a method for distributing an engine torque between a first wheel set and a second wheel set of an automobile vehicle with at least two drive wheel sets equipped with a mode selector switch moveable between at least a first, stable, position for activation of a first mode of distribution of the engine torque and a second, unstable, position for activation of a second mode of distribution of the engine torque for an off-road use of the vehicle, in which, in the second distribution mode, it is determined whether the vehicle exceeds a first predetermined threshold for maximum speed in off-road mode, and, in the affirmative, the first off-road distribution mode is engaged, characterized in that, in the second distribution mode, it is determined whether the vehicle exceeds a second predetermined intermediate speed threshold in off-road mode, strictly lower than first maximum speed threshold in off-road mode, for a period of time greater than a time Tthreshold2, and, in the affirmative, the first distribution mode is engaged.

BRIEF DESCRIPTION OF THE FIGURES

Other aims, features and advantages of the invention will become apparent upon reading the description that follows, presented by way of non-limiting example and with reference to the appended drawings, in which.

For improved clarity, identical or similar elements are identified by identical reference indications throughout the figures.

DETAILED DESCRIPTION OF ONE EMBODIMENT

Figure 1:
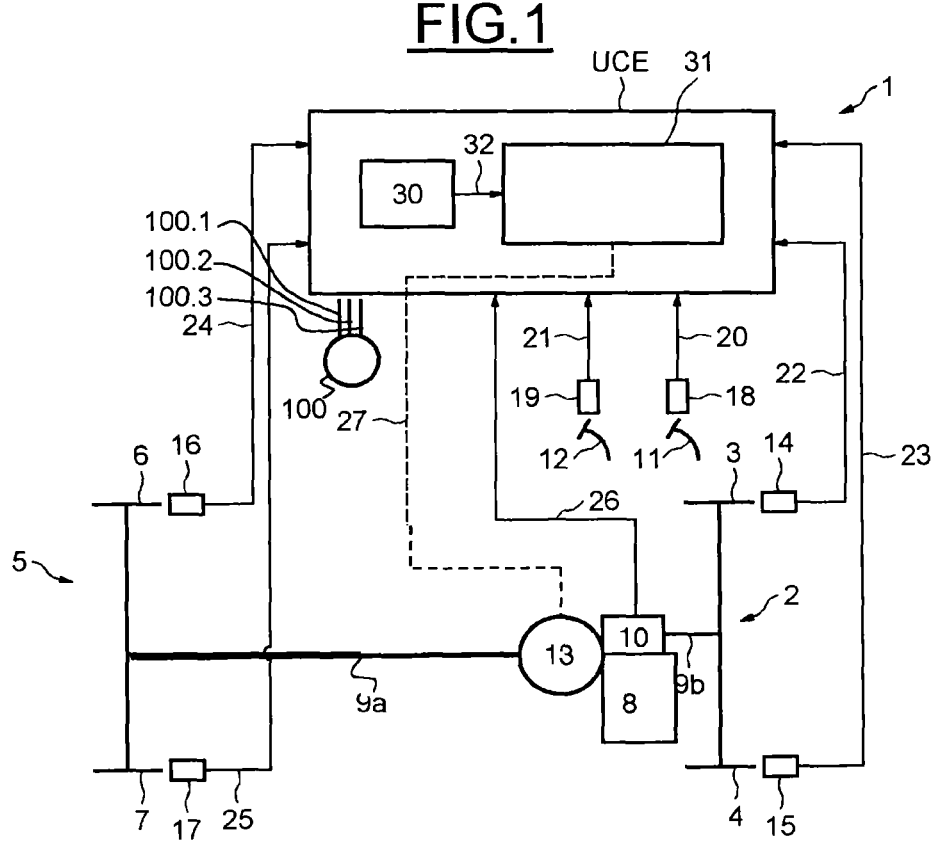
FIG. 1 illustrates schematically a device for distributing an engine torque of an automobile vehicle.

FIG. 1 shows a device 1 for distributing an engine torque of an automobile vehicle. The automobile vehicle comprises a front wheel set 2 on which two front wheels 3 and 4 are mounted, a rear wheel set 5 on which two rear wheels 6 and 7 are mounted, and a source of engine torque 8 designed to drive the wheels 3, 4, 6 and 7 of the automobile vehicle. This source of engine torque 8 drives the rear wheels 6, 7 via a means of rear transmission 9a and drives the front wheels 3, 4 via a means of front transmission 9b. The source of engine torque 8 may be an electric motor, an internal combustion engine, or a hybrid solution. The automobile vehicle furthermore comprises a gearbox 10 for transmitting the engine torque to the wheels 3, 4, 6 and 7 of the vehicle, an accelerator pedal 11 and a clutch pedal 12. It will be noted that the clutch pedal 12 is optional; indeed, the vehicle can be equipped with an automatic gearbox and, in this case, the vehicle does not comprise a clutch pedal. The torque is distributed by a torque distributor 13 shown here very schematically and which can be disposed downstream of the gearbox 10 or integrated into the latter.

The distribution device 1 furthermore comprises a manual selector switch knob 100, with several indexed positions, namely:
- a first, stable, position called "four wheel drive—on-road",
- a second, unstable, position called "four wheel drive—off-road" and,
- optionally, a third, stable, position called "two wheel drive".

The second position is unstable in the sense that, in the absence of any solicitation by the driver, the selector switch automatically returns from the second position to the first position under the solicitation of a return spring.

The selector switch has three connections 100.1, 100.2, 100.3 respectively delivering three signals S1, S2 and S3. In the first position, the selector switch only delivers the signal S1. In going from the first position to the second position, the signal S1 continues to be emitted, simultaneously with the signal S2. In the third position, the selector switch only delivers the third signal S3. However, between the first position and the third position, there exists an overlap region in which the signals S1 and S3 are simultaneously present. Thus, it is possible at any moment in time to determine the state of the selector switch as a function of the signals S1, S2 and S3.

The signal S2 is only emitted in a transient manner, when the selector switch goes into the second position before being released.

The distribution device 1 comprises an electronic control unit UCE, which controls the torque distributor 13, and speed sensors 14 to 17 designed to respectively measure the speed of each of the wheels 3, 4, 6 and 7 of the automobile vehicle, together with two position sensors 18 and 19 for respectively measuring the positions of the accelerator pedal 11 and of the clutch pedal 12.

Figure 2:
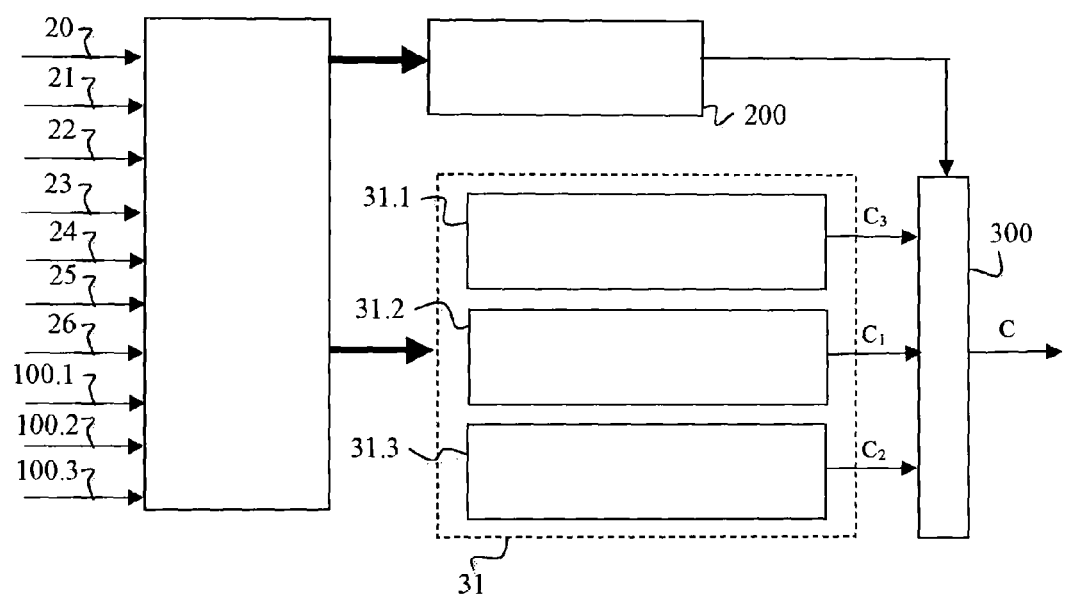
FIG. 2 illustrates schematically an embodiment of the means for generating a torque distribution setpoint.
Figure 3:
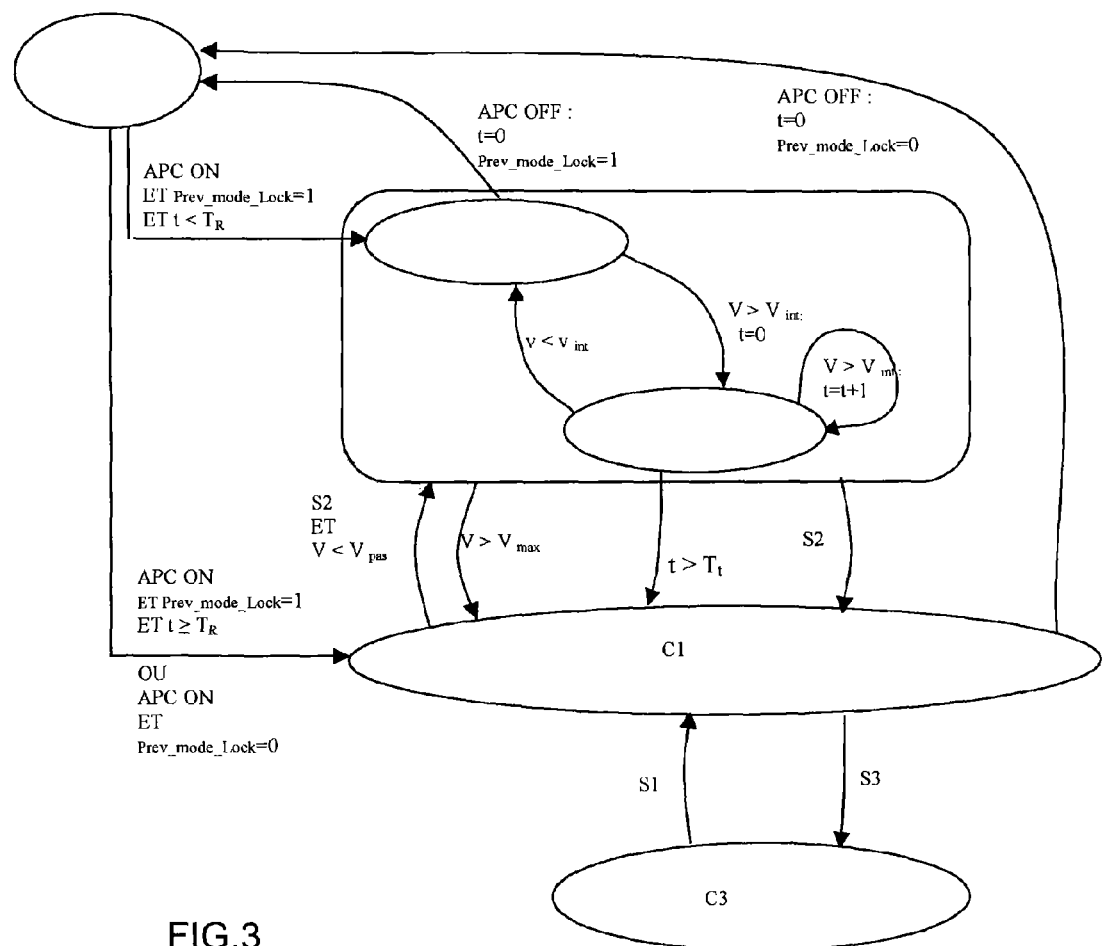
FIG. 3 illustrates schematically a method for selecting a setpoint for distribution of the torque.

The UCE, illustrated in FIG. 2, is configured for receiving the position of the accelerator pedal 11 emitted from the position sensor 18 via a connection 20, a position of the clutch pedal 12 emitted from the position sensor 19 via a connection 21, the speeds of the wheels 3, 4, 6 and 7 respectively emitted by the speed sensors 14 to 17 and respectively transmitted via connections 22 to 25. The UCE is furthermore configured for receiving the information on the gear ratio engaged from the gearbox 10 via a connection 26. The UCE also receives the signals S1, S2 and S3 from the manual selector switch 100 via the connections 100.1, 100.2 and 100.3.

The UCE allows a torque distribution setpoint C to be generated as a function of the information on speed, on position and on gear ratio engaged, this setpoint being delivered to the torque distributor. By convention in this description, it will be considered that only the front wheel set of the vehicle is driven when the torque setpoint C is zero, which means in this case that the torque transmitted to the secondary rear wheel set is zero.

The UCE comprises calculation means 30 for calculating various pieces of information based on information received from the elements of the automobile vehicle and for transmitting the information calculated via a wired network 32 to generation means 31 comprising means 31.1 for generating a setpoint in on-road mode C1, means 31.2 for generating a setpoint in off-road mode C2, and means 31.3 for generating a setpoint in two wheel drive mode C3. These three setpoint values C1, C2, C3 supply a block dedicated to the generation of a smoothed torque transfer command without interruption C which, outside of the transient periods, is equal to one of the values C1, C2, C3. It is this setpoint C which is delivered by the UCE to the torque distributor 13.

The means 31.1 for generating the setpoint in on-road mode C1 essentially take into account the speed of the vehicle V and the difference in speed $\Delta\omega$ between the front wheel set and the rear wheel set. They can also take into account the temperature $\theta$ of the torque distributor, which can be measured by means of a temperature sensor or estimated from the time history of the speed difference $\Delta\omega$, as described for example in the application WO2010/007271. The generation means 31.1 can also be equipped with specific means for optimizing the setpoint when the vehicle is started, as described for example in the document WO2009/095627. The generation means 31.1 may also be equipped with specific means for optimizing the setpoint in bends or in braking situations, as described in the application WO2007/138221.

The means 31.2 for generating the setpoint in off-road mode C2 may simply impose a constant torque transfer ratio between the front wheel set and the rear wheel set. The strategy may however be more elaborate, such as provided for example in the application FR 09/55718.

The generation means 31.3 may, on the other hand, deliver a setpoint C3=0, corresponding to the total absence of torque transfer, where a non-zero, but low, setpoint designed to maintain the whole of the system 9a for transmission to the secondary wheel set 5 in motion, while at the same time minimizing the fuel consumption.

The UCE is also equipped with means 200 for selecting the setpoint applied, as a function of the movements of the selector switch 100, of the speed of the vehicle and of the state of the electrical power supply to the engine APC. When the selector switch is in the first position, the UCE responds to the first signal S1 so as to deliver the torque setpoint generated by the generation means 31.1 to the torque distributor. In a similar manner, when the selector switch is in the third position, the UCE responds to the third signal S1 so as to deliver the torque setpoint generated by the generation means 31.3 to the torque distributor.

Starting from the first position, when the selector switch is moved to the second position, the UCE verifies that the speed of the vehicle is lower than a predetermined speed threshold $V_{pas}$ for switching to off-road mode and, in the affirmative, responds to the conjunction of the signals S2 and S1 selects the setpoint C2 generated by the generation means 31.2 so as to deliver it to the torque distributor 13. If, in contrast, the speed of the vehicle is greater than the speed threshold for switching to off-road mode $V_{pas}$, the means for selecting the applied setpoint C1 conserves the setpoint generated by the generation means 31.1.

When the means 200 for selecting the applied setpoint have chosen the off-road mode and the setpoint C2 generated by the generation means 31.2, this setpoint is conserved for as long as one of the three following conditions has not been met:

the speed of the vehicle exceeds a maximum speed in off-road mode $V_{max}$;

the speed of the vehicle exceeds an intermediate speed threshold in off-road mode $V_{int}$ and remains higher than this threshold for a period of time greater than a predetermined period $T_T$;

the electrical power supply of the vehicle is switched off for a period of time greater than a predetermined dwell time $T_R$.

When one of the conditions is met, the selection means select the on-road mode and deliver the setpoint C1 from the generation means 31.1 to the torque distributor. It will be understood that the speed for engaging off-road mode $V_{pas}$ is lower than the maximum speed in off-road mode $V_{max}$. Similarly, the speed $V_{int}$ is lower than $V_{max}$. These three threshold values are determined during the setup phase and stored in a non-volatile memory of the vehicle.

The storage in memory of the off-road mode after switching off the electrical power supply of the vehicle for a given period of time allows the vehicle, in off-road driving conditions, to be restarted in off-road mode after having stalled, which can frequently happen in difficult driving conditions. The dwell time $T_R$ is therefore chosen in such a manner as to be greater than the time needed for the driver to restart the vehicle.

The intermediate speed threshold for off-road mode $V_{int}$ is, on the other hand, used to limit the power consumption when the conditions encountered by the vehicle are more like on-road conditions, even though the vehicle is traveling at a speed lower than the off-road mode $V_{max}$ maximum speed.

Of course, the invention is not limited to the exemplary embodiment illustrated by the figures. The invention is for example applicable to a vehicle whose selector switch has only two positions, one of which is stable and one unstable, corresponding to two modes of operation and two strategies for generating the torque setpoint. It is also applicable when more than three modes of operation are envisioned.

The invention is applicable to vehicles with more than two drive wheel sets. Each wheel set may furthermore have any given number of wheels, preferably greater than or equal to two.

The invention claimed is:

1. A device for distributing an engine torque between a first wheel set and a second wheel set of an automobile vehicle with at least two drive wheel sets, comprising:
    a manual distribution mode selector switch, moveable between at least a first stable position and a second unstable position, the selector switch being mechanically returned from the second unstable position to the first stable position in absence of any solicitation by a driver, the selector switch delivering a transient signal for selection of a four wheel drive off-road mode when going from the first to the second position;
    a torque distributor for distributing engine torque between the first wheel set and the second wheel set, as a function of a torque distribution setpoint;
    means for generating the torque distribution setpoint as a function of at least movements of the selector switch and of speed of the vehicle, comprising:
        means for determining a first setpoint value for distribution of the torque between the first wheel set and the second wheel set such that both wheel sets are driven in a four wheel drive on-road mode;
        means for determining a second setpoint value for distribution of the torque between the first wheel set and the second wheel set such that both wheel sets are driven in the off-road mode;
        means for determining a third setpoint value for distribution of the torque between the first wheel set and the second wheel set such that only one of the wheel sets is driven in a two wheel drive mode; and
    selection means for selecting the first setpoint value or the second setpoint value as a torque distribution setpoint, the selection means going from the first setpoint value to the second setpoint value at least when the selector switch delivers the signal for selection of the off-road mode while the speed of the vehicle is less than a predetermined threshold for engaging the off-road mode, the selection means going from the second setpoint value to the first setpoint value at least when one of the following conditions is met:
        the speed of the vehicle exceeds a predetermined threshold for maximum speed in the off-road mode; and
        the speed of the vehicle exceeds an intermediate speed threshold in the off-road mode and remains higher than the intermediate speed threshold for a period of time greater than a predetermined time, the intermediate speed threshold being lower than the predetermined threshold for maximum speed in the off-road mode.

2. The distribution device as claimed in claim 1, wherein the means for generating the setpoint comprises a timer activated when the electrical power supply of the vehicle is switched off while the second setpoint value is selected, then restarted after a stopped time, such that the vehicle is automatically restarted with the second setpoint value selected if the stopped time is less than a dwell time, and otherwise the first setpoint value is selected.

3. The distribution device as claimed in claim 2, wherein the dwell time is greater than a time needed for restarting the engine after stalling.

4. The device as claimed in claim 1, wherein, in the first position, the selector switch delivers a continuous signal for selection of an automatic mode.

5. The device as claimed in claim 4, wherein the selector switch is moveable between the first position and a third stable position, the first position being situated between the second and the third position, the selector switch in the third position delivering a continuous signal for selection of the two wheel drive mode, and the selection means being capable of selecting the third setpoint value as the torque distribution setpoint at least when the selector switch delivers the third selection signal.

6. The device as claimed in claim 5, wherein the selector switch delivers only a signal for selection of the two wheel drive mode when in the third position.

7. The device as claimed in claim 5, wherein the selector switch delivers only a signal for selection of the on-road mode when in the first position, the selector switch delivers the signal for selection of the on-road mode and the signal for selection of the off-road mode simultaneously when going from the first position to the second position, and the selector switch delivers only a signal for selection of the two wheel drive mode when in the third position.

8. The device as claimed in claim 1, wherein the first setpoint value goes from a maximum value to a zero value when the speed of the vehicle increases.

9. The device as claimed in claim 1, wherein the selector switch delivers only a signal for selection of the on-road mode when in the first position.

10. The device as claimed in claim 9, wherein the selector switch delivers the signal for selection of the on-road mode and the signal for selection of the off-road mode simultaneously when going from the first position to the second position.

11. A method for distributing an engine torque between a first wheel set and a second wheel set of an automobile vehicle with at least two drive wheel sets including a mode selector switch moveable between at least a first stable position for activation of a first mode of distribution of the engine torque between the first wheel set and the second wheel set such that both wheel sets are driven in a four wheel drive on-road mode, a second unstable position for activation of a second mode of distribution of the engine torque between the first wheel set and the second wheel set such that both wheel sets are driven in a four-wheel drive off-road mode, and a third stable position for activation of a first mode of distribution of the engine torque between the first wheel set and the second wheel set such that only one of the wheel sets is driven in a two wheel drive mode, the method comprising:
    in the second distribution mode, determining whether the vehicle exceeds a first predetermined speed threshold, and, in the affirmative, engaging the first distribution mode; and
    in the second distribution mode, determining whether the vehicle exceeds a second predetermined speed threshold, strictly lower than the first predetermined speed threshold, for a period of time greater than a predetermined time, and, in the affirmative, engaging the first distribution mode.

* * * * *